United States Patent Office 3,397,184
Patented Aug. 13, 1968

3,397,184
POLYURETHANE PLASTICS
Wolfgang Heydkamp, Leverkusen, Wilhelm Kallert, Cologne-Stammheim, Erwin Müller, Leverkusen, and Helmut Freytag, Cologne-Stammheim, Germany, assignors to Farbenfabriken Bayer Aktiengesellschaft, Leverkusen, Germany, a German corporation
No Drawing. Filed Mar. 3, 1965, Ser. No. 436,950
Claims priority, application Germany, Mar. 7, 1964,
F 42,241
11 Claims. (Cl. 260—77.5)

ABSTRACT OF THE DISCLOSURE

Polyurethane plastics are prepared by reacting an organic polyisocyanate, an organic compound having a molecular weight of at least 600 and containing active hydrogen atoms and a glycol having a molecular weight less than 460 and having the formula

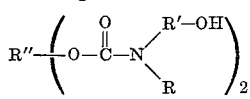

or

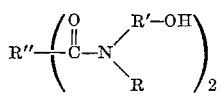

where R is a monovalent organic radical, R' is a divalent aliphatic radical having from 2 to 4 carbon atoms, and R'' is a divalent organic radical that is the residue remaining after the removal of the carboxyl groups of dicarboxylic acid or the residue remaining after the removal of the hydroxyl groups from an organic diol.

---

This invention relates to polyurethane plastics and a method of producing the same. More particularly, it relates to polyurethane plastics using novel cross-linking agents in the production thereof.

The production of cross-linked synthetic resins based on polyhydroxyl compounds, polyisocyanates and chain lengthening agents or crosslinking agents having reactive hydrogen atoms has been heretofore known. The proportions may be so chosen that free NCO groups remain and the molten reaction mixture may be poured into molds, cross-linkages being formed by way of allophanate groups, biuret groups, by polymerization or the like after it has been poured. Elastic shaped articles are obtained. Alternatively, the NCO groups which remain may be stabilized or the process may be carried out with equivalent quantities or with an excess of reactive hydrogen atoms. By this method, there are obtained polyurethane compositions which can be stored and which can be cross-linked with cross-linking agents in a manner similar to crude rubber by the usual methods of the rubber industry, for example, on rollers. Polyurethane compositions with or without free NCO groups may also be drawn into foils from the melt or from solutions, undergoing cross-linkage in the process and used as adhesives. Suitable cross-linking agents are, for example, additional polyisocyanates, sulphur, peroxides or formaldehyde. Cross-linking may also be effected with the aid of quaternating agents. In these cases, the presence of specific chemical groups in the polyurethane composition is desirable and in some cases even necessary to enable the cross-linking agent to act on the composition.

It is an object of this invention to provide improved polyurethane plastics. It is another object of this invention to provide an improved process of making polyurethane plastics. It is still another object of this invention to provide polyurethane plastics having improved tensile strength, structural stability, abrasion resistance, lower permanent elongation, resistance to solvents, oils, oxidation and low temperatures. It is another object of this invention to provide clear, transparent polyurethane plastics.

The foregoing objects and others which will become apparent from the following description are accomplished in accordance with the invention generally speaking by providing polyurethane plastics by reacting an organic polyisocyanate with an organic compound having a molecular weight of at least 600 and containing active hydrogen atoms which are reactive with NCO groups and a glycol having a molecular weight less than about 460 and having the formula

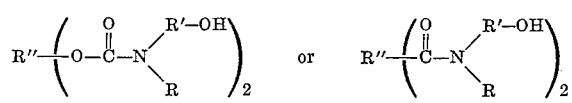

where R is a monovalent organic radical, R' is a divalent aliphatic radical having 2–4 carbon atoms and R'' is a divalent organic radical.

In accordance with the invention, the radical R may be any suitable monovalent organic radical such as, for example, alkyl, cycloalkyl, aryl, alkenyl, cycloalkenyl, aralkyl, alkaryl and the like such as, for example, methyl, ethyl, n-propyl, isopropyl, n-butyl, isobutyl, sec-butyl, t-butyl, n-pentyl, 1-methyl-butyl, 2-methyl-butyl, 3-methyl-butyl, 1,1-dimethylpropyl, 1,2-dimethylpropyl, 2,2-dimethylpropyl, 1-ethylpropyl, hexyl, heptyl, octyl, nonyl, decyl, undecyl, dodecyl and the like; cyclopropyl, cyclobutyl, cyclopentyl, cyclohexyl, cycloheptyl and the like; phenyl, α-naphthyl, β-naphthyl and the like; ethenyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methylene-2-propenyl, 1-pentenyl, 2-pentenyl, 3-pentenyl, 4-pentenyl, 1-hexenyl, 2-hexenyl, 3-hexenyl, 4-hexenyl, 5-hexenyl and the like; α-cyclohexyl-ethenyl, β-cyclohexyl-ethenyl and the like; benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl and the like; o-tolyl, m-tolyl, p-tolyl, 2,3-xylyl, 2,4-xylyl, 2,5-xylyl, 2,6-xylyl, 3,4-xylyl, 3,5-xylyl, o-cumenyl m-cumenyl, p-cumenyl, mesityl, o-ethylphenyl, m-ethylphenyl, p-ethylphenyl and the like. The radical R may contain tertiary nitrogen atoms, heteroatoms and a cyclic radical and the like.

The radical R' may be any suitable divalent aliphatic radical having 2–4 carbon atoms such as, for example, ethylene, propylene, butylene, isopropylene, isobutylene, secondary butylene and the like. The radical R'' may be any suitable divalent organic radical such as any of those radicals mentioned above for R but which are divalent rather than monovalent. The preferred radicals represented by R'' are saturated aliphatic radicals having 2–7 carbon atoms and phenylene.

With the use according to the invention of this chain lengthening agent it is possible, with suitable modification of the radical R, to carry out any of the types of cross-linking hitherto known for synthetic polyurethane resins. If, for example, R is an alkyl-aryl or cycloalkyl radical, then the elastomers obtained from them in the casting process are distinguished by their improved physical properties for permanent elongation, by their transparency, by increase in the casting time during the manufacturing process and in some cases, also by improved stability to light. The shaped articles obtained from polyesters and polyethers are glass clear, soft and sufficiently cross-linked for a good synthetic resin, respectively elastomer.

Also, if, for example, R is an unsaturated group such as an allyl-, methallyl-, cyclohexenyl- or dihydropyranyl-group, then vulcanizable polyurethane compositions which are stable on storage and can easily be cross-linked with sulphur or peroxides may be produced with advantage. Compared with known polyurethane compositions having unsaturated side-groups, which are cross-linked with such cross-linking agents, the polyurethane compositions produced with the aid of the cross-linking agents used according to the invention have better material properties after vulcanization. On the other hand, it is remarkable that the polyurethane compositions prepared by this method will cross-link with a very large number of vulcanization auxiliary agents, with accelerators from all known classes and with many different kinds of peroxides. The polyurethane compositions hitherto known for this purpose usually contain monoallyl glycerol ether as chain-lengthening agent which permits the attack of the cross-linking agent. These polyurethane compositions which can be stored, depend to a much greater extent on the use of certain vulcanization accelerators than those of the present invention. This is clear from Example 4 and the comparative tests which follow it. The products according to the invention have improved tensile strength, structural stability and DIN abrasion as well as a lower permanent elongation. The resistance of the products to oil and organic solvents, their low swelling, their resistance to oxidation by air and ozone and their good resistance to low temperatures, are also worth mention.

If, for example, R is a dialkylaminoalkyl radical or a cycloalkylaminoalkyl radical, in other words, if for example, R contains tertiary nitrogen atoms, then the storable polyurethane compositions obtainable by the process of the invention can be cross-linked by quaternating with mono- or bifunctional quaternating agents as cross-linking agents. The products of the process again have characteristic advantages over those polyurethane compositions cross-linked by quaternating which contain the tertiary nitrogen in the structural chain. One of these advantages is the facilitation of the quaternization reaction may be carried out in very mild reaction conditions and using shorter reaction times.

In the process in accordance with this invention, any suitable organic compound containing active hydrogen atoms which are reactive with NCO groups and having a molecular weight of at least about 600 are preferably from about 800 to about 4000 and for best results, from about 1000 to about 2500 may be used such as, for example, hydroxyl polyesters, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, thiodibutyric acid, sulfonyl dibutyric acid, maleic acid, fumaric acid, citraconic acid, itaconic acid and the like. Any suitable polyhydric alcohol may be used in the reaction with the polycarboxylic acid to form a polyester such as, for example, ethylene glycol, diethylene glycol, propylene glycol, butylene glycol, neopentyl glycol, amylene glycol, hexanediol, hexahydroxylene glycol, bis-(hydroxyl-methyl-cyclohexane) and the like. Of course, the hydroxyl polyester may contain urethane groups, urea groups, amide groups chalkogen groups and the like. Thus, the hydroxyl terminated polyester includes in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxyl ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, di-ethylene glycol, triethylene glycol, 1,4-phenylene-bis-hydroxy ethyl ether, 2,2'-diphenyl propane-4,4'-bis-hydroxyl ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocyanate, cyclopentylene-1,3-diisocyanate, cyclohexylene - 1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane - 4,4' - diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone - 4,4'-diisocyanate, dichlorohexamethylene diisocyanate, furfurylidene diisocyanate, 1-chlorbenzene-2,4-diisocyanate and the like. It is preferred that aromatic diisocyanates be used and for best results, 4,4'-diphenylmethane diisocyanate or toluylene diisocyanate have proven to be especially suitable.

The chain lengthening agents to be used according to the invention are bis-amides or bis-urethanes and should have a molecular weight below 460. They may be obtained in high yields by known methods either from di-acid chlorides or from di-chlorocarbonic acid esters and alkanol-amines substituted on the nitrogen. Appropriate di-acid chlorides are, for example, oxalic acid dichloride, malonic acid dichloride, succinic acid dibromide, glutaric acid dichloride, adipic acid dichloride, cyclopentane dicarboxylic acid chlorides, cyclohexanic dicarboxylic acid chlorides, 2,2-dimethylglutaric acid chloride, 1,1-dimethyl adipic acid chloride, phenyl succinic acid chloride, terephthalic acid halides, homophthalic acid chloride, chlorinated terephthalic acid halides, naphthoic diacid chlorides, itaconic acid chloride, chlorocarboxycinnamic acid chloride, furane dicarboxylic acid chloride, hexahydro-terephthalic acid chloride, pyridine dicarboxylic acid chlorides.

Suitable di-chlorocarbonic acid esters are prepared from phosgene and one of the following diols: ethylene glycol, 1,2-propylene glycol, 1,3-propylene glycol, butane-diol, hexane-diol, decane diol, 2,2-dimethyl propandiol, 2-phenylpropandiol, 1,3-cyclopentane diol, 1,3- or 1,4-cyclohexane diol, 1,4-dihydroxymethyl cyclohexane, norbornane diol, 4-cyclohexyl phenol, 4,4-dihydroxydicyclohexyl dimethyl methane, octahydronaphtdiol, hydroquinone, resorcine, dibenzyl alcohol, 4,4'-dihydroxydiphenylmethane, hydroxybenzyl alcohol, dihydroxydiphenylsulfone, di-(hydroxyethyl)-hydroquinone, 1-phenylethanediol-1,2, 4,4' - dihydroxyazobenzene, dihydroxybenzophenone, 1,4 - dihydroxystilbene, naphthoresorcine, di-(hydroxymethyl)-furane, di - (hydroxymethyl) - thiophene, di-(hydroxymethyl)-pyridine, di-(hydroxy-methyl)-dioxane, di-(hydroxymethyl)-piperidine, 4 - isoquinolinepropanediol, di-(hydroxyethyl) - benzimidazol, di - (hydroxymethyl)-piperazine, di - (hydroxyethyl)-piperazine. Typical examples are (1)   HOCH₂—CH₂—N(CH₃)—COO—(CH₂)ₓOCO—N(CH₃)—CH₂—CH₂—OH    x=2-7

(2) 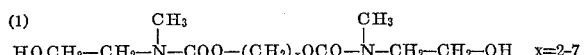

(3) 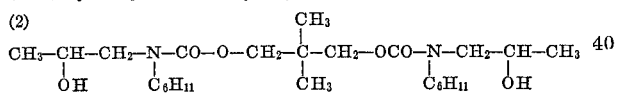

(4) 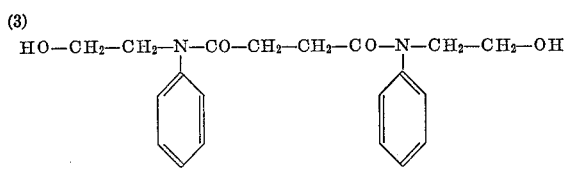

(5) 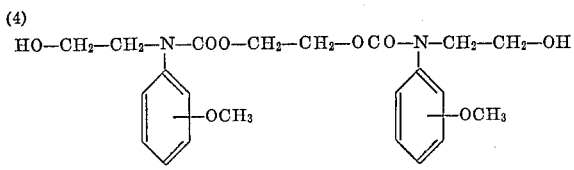

(6) 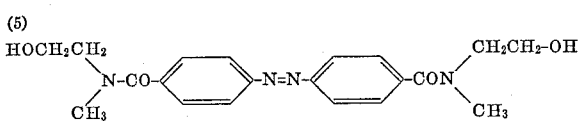

(7) 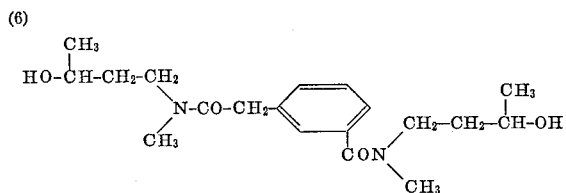

(8) 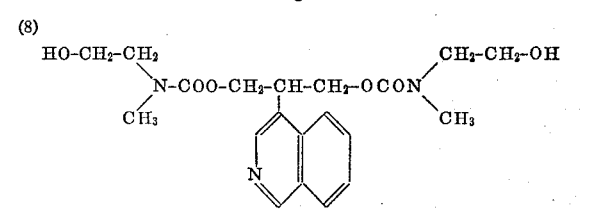

(9) 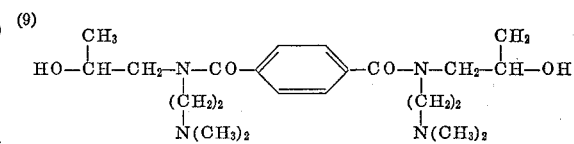

(10) 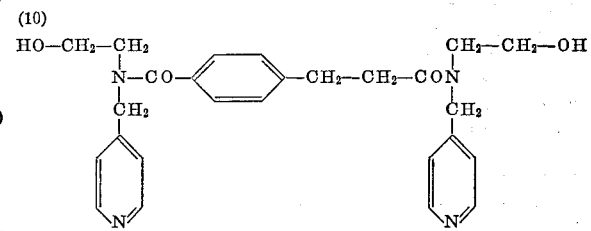

(11) 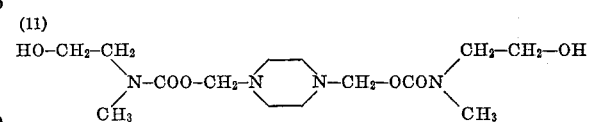

(12) 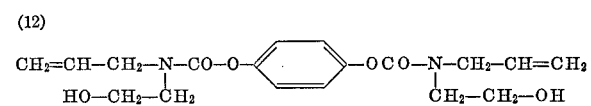

(13) 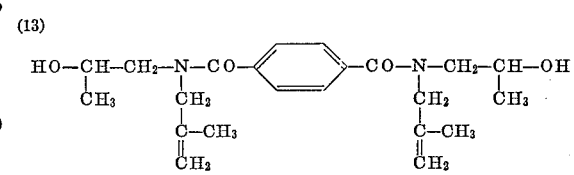

(14) 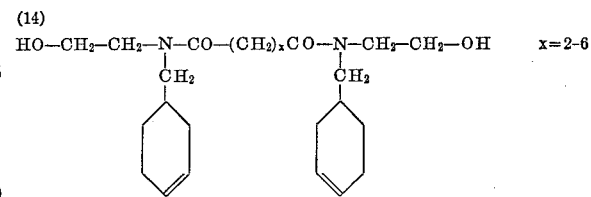

(15) 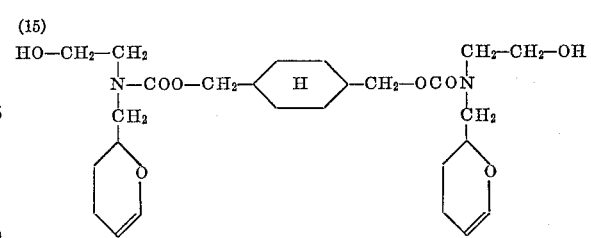

The reaction of the components is otherwise carried out in known manner. The anhydrous active hydrogen containing compounds may first be reacted with an excess of diisocyanate and the bis-urethanes or bis-amides to be used according to the invention may then be added, advantageously at 80 to 130° C., in particular at about 100° C. Alternatively, the polyhydroxyl compounds and chain lengthening agent may first be mixed or the chain lengthening agent may first be treated with excess diisocyanate and the polyhydroxyl compounds may then be added afterwards. As is known from the state of the art, depending on the proportions used, especially on the OH:NCO ratio, there are obtained pourable melts or storable polyurethane compositions which may also be prepared in solution or brought into solution and generally applied from this solution.

Well-known chain lengthening agents such as the usual glycols, amino alcohols, diamines and water may also be added.

If the cross-linking is to be carried out with additional cross-linking agents via the storable intermediate stage, then other polyisocyanates, in particular dimeric toluylene diisocyanate, and formaldehyde and sulphur and peroxides such as, for example, di-tertiary butyl and di-cumyl-peroxide may be used as cross-linking agents. In the case of quaternating, an example of a quaternizing cross-linking agent that may be used is dimethyl sulphate. Abrasion resistant carbon black, silicates, talcum, zinc-, cadmium- or magnesium salts, dyestuffs, plasticizers, oxidation inhibitors and age resistors may be included in the usual way in the vulcanization.

The process according to the invention is to be recommended wherever it is desired to obtain highly cross-linked products which do not attain their final shape until they are drawn and which should be transparent. Synthetic resins cross-linked with sulphur or peroxides are of interest for the manufacture of pipes, tires, belts and flexible tubes, for footwear, as insulating materials and as coatings for fabrics. Products cross-linked by quaternization can be used for high grade foils, coating materials, fabric binders and latices for dyestuffs and adhesives.

The invention is further illustrated but not limited by the following examples in which parts are by weight unless otherwise specified.

EXAMPLE 1

(a) Preparation of the starting material

About 151 parts N-methylethanolamine are dissolved in about 600 parts by volume of benzene, about 160 parts potassium carbonate in about 200 parts by volume of water are added as a lower layer and about 215 parts of butane-dichloro-carbonic acid ester in about 400 parts by volume of benzene are added dropwise at about 25 to about 30° C. After about 2½ hours reaction at about 60° C., the aqueous phase with the precipitated salt is separated and the benzene solution is stirred with about 250 parts by volume of water, again at about 60° C. After further separation of the two phases, the salt-free organic layer is freed from solvent and the residue is dried for about 6 to about 8 hours in vacuo at about 80° C. bath temperature. An 85–90% yield of an oil of low viscosity is obtained which is neutral in reaction and has the OH number 370 to 375 (calculated 382).

(b) Reaction according to the invention

About 90 parts of naphthylene-1,5-diisocyanate are added to about 500 parts polypropylene glycol (OH number 57) which has been dehydrated from about 125 to about 130° C. at about 12 mm. Hg and the reaction is maintained for about 40 minutes at from about 130 to about 140° C., cooled to about 100° C. and about 18 parts of the compound prepared according to (a) is added. The material poured into molds solidifies only after further heating at about 100° C. for about 24 hours. The physical properties measured are tensile strength 85 kp./cm.$^2$, elongation at break 275%, Shore hardness A 58 (20° C.) and 58 (70° C.), elasticity 49, permanent elongation (1 minute after tearing) 0%.

EXAMPLE 2

(a) Preparation of the starting material

About 135 parts of potassium carbonate dissolved in about 150 parts by volume water are added to the solution of about 215 parts (1.50 mol) N-cyclohexylethanolamine in about 750 parts by volume benzene, about 177 parts of hydroquinonedichlorocarbonic acid ester in about 750 parts by volume of benzene are added dropwise at from about 20 to about 30° C. in the course of about one hour. After about 3 hours heating at about 65° C., the aqueous phase is separated, the organic phase is washed with dilute hydrochloric acid and then with water and the solvent is distilled off. A colorless oil which crystallizes only slowly remains behind as residue in 98% yield. OH number 246 (calculated 249.5).

(b) Reaction according to the invention (I) About 81 parts diphenylmethane-1,4-diisocyanate is added to about 200 parts polypropylene glycol (OH number 57) after dehydration at about 125° C. and about 12 mm. Hg, the reaction mixture is heated to about 130° C. for about 30 minutes and finally about 46 parts of the compound according to (a) heated to about 120° C. is stirred into the mixture. The casting time is from about 4 to about 6 minutes. After about 24 hours storage of the cast molded articles at about 100° C., the following values are obtained: Tensile strength 135 kp./cm.$^2$, elongation at break 275%, structural stability 16%, Shore hardness A 71 (20° C.) and 70 (70° C.), permanent elongation 3%.

(II) If the reaction is carried out with about 200 parts polyester of adipic acid, butanol and ethylene glycol (OH number 56) and stirred with about 80 parts of the same diisocyanate and with about 46 parts of the compound according to (a), then a cross-linked synthetic resin is obtained which after about 24 hours tempering at about 100° C. has the following properties: Tensile strength 133 kp./cm.$^2$, elongation at break 430%, tension at 20% elongation 6 kp./cm.$^2$, at 300% 33 kp./cm.$^2$, structural stability 13 kp., Shore hardness A 64 (20° C.) and 63 (70° C.), permanent elongation 2%.

EXAMPLE 3

(a) Preparation of the starting material

A solution of the bis-urethane is prepared as in Example 1 from about 138 parts freshly distilled N-phenyl-ethanolamine in about 500 parts by volume of benzene, about 104 parts potassium carbonate in about 200 parts by volume water and about 92 parts ethylene-dichloro-carbonic acid ester in about 500 parts by volume of benzene. The yield of thick viscous oil is 93% of the theoretical. OH numbers 284 to 287 (calculated 289).

(b) Reaction according to the invention (I) After dehydration at about 125° C. and about 12 mm. Hg, about 70 parts naphthylene-1,5-diisocyanate are added to about 200 parts polypropylene glycol (OH number 57), stirred for about 30 minutes at about 125 to about 130° C., and about 60 parts of the compound according to (a) heated to about 120° C. are added. The cast molded articles produced from the molten reaction product are after-treated at about 100° C. for about 24 hours and exhibit a tensile strength 156 kp./cm.$^2$, elongation at break 430%, structural stability 15 kp., Shore hardness A 72 (20° C.) and 71 (70° C.) and permanent elongation 9%.

(II) When about 200 parts of polyester (OH number 56) of adipic acid, butanediol and ethylene glycol, about 80 parts 4,4'-diphenylmethane diisocyanate and about 60 parts of compound according to (a) are used, the method of procedure described above produces a product having tensile strength 106 kp./cm.$^2$, elongation at break 430%, structural stability 13 kp., Shore hardness A 64 (20° C.) and 63 (70° C.) and a permanent elongation of 2%.

(III) Using about 200 parts of a modified polybutylene glycol (OH number 96) prepared from polybutylene glycoldichlorocarbonic acid ester and 2 mols of N-methyl-ethanolamine according to German patent application F 40,705 IV c/39 b and 56 parts toluylene-2,4-diisocyanate as well as about 38.5 parts of the compound according to (a), there is obtained, by the process described above, a reaction melt from which filaments having the following properties can be drawn: Tensile strength 186 kp./cm.$^2$, elongation at break 595%, tension at 20% elongation 41 kp./cm.², at 300% elongation 114 kp./cm.², Shore hardness A 76 (20° C.) and 74 (70° C.) and permanent elongation 5%.

EXAMPLE 4

(a) Preparation of the starting material

N-allylethanolamine is prepared from allylamine and ethylene oxide in the presence of water at from about 50 to about 52° C., calculated on the amount of amine reacted, the yield is 58 to 60% of the theoretical:

$$n_D^{20} = 1.4630$$

B.P. 86–88° C. at 3 mm. Hg. The reaction with butanedichlorocarbonic acid ester is carried out as described in Example 1. Yield 93% of theoretical, M.P. 65–67° C.

(b) Reaction according to the invention

About 35.5 parts butanediol and about 100 parts of the compound according to (a) are added to about 1000 parts polyester of adipic acid, butanediol and ethylene glycol (OH number 56.5), and about 301 parts diphenylmethane - 4,4′ - diisocyanate are introduced at about 105° C. After stirring for about 15 minutes, the material is poured into cups and heated for about 24 hours at about 100° C. Defo values are 750 to 1200. Carbon black and vulcanizing agents are incorporated on rollers and vulcanization takes place at about 161° C. for about 20 minutes. To demonstrate that high grade products of very different material properties can be obtained from these polyurethane compositions merely by altering the vulcanization prescriptions, the vulcanization prescription only is given below in each case with the corresponding physical properties.

About 0.5 part of stearic acid is incorporated by rolling with about every 100 parts of starting material.

(I) About 100 parts polyurethane composition, about 30 parts high abrasion furnace black, about 5.0 parts zinc oxide active, about 1.5 parts sulphur, about 1.5 parts tetramethylthiuramic disulphide, about 0.75 part 2-mercaptobenzthiazole give a product having 211 kp./cm.² tensile strength, 405% elongation at break, 25 kp. structural stability, 22% elasticity, 18% permanent elongation, Shore hardness A 70 (20° C.) and a DIN abrasion of 80 (Natural rubber=100).

(II) About 100 parts polyurethane composition, about 30 parts high abrasion furnace black, about 2.0 parts sulphur, about 4.0 parts dibenzthiazyl disulphide, about 2.0 parts 2-mercaptobenzthiazole, about 1.0 part zinc chloride complex of dibenzthiazyl disulphide and about 0.5 part cadmium stearate give a product having 272 kp./cm.² tensile strength, 430% elongation at break, 24 kp. structural stability, 17% elasticity, 14% permanent elongation, Shore hardness A 67 (20° C.) and a DIN abrasion of 55.

(III) About 100 parts polyurethane composition, about 30 parts high abrasion furnace black, about 2.0 parts sulphur, about 4.0 parts dibenzthiazyl disulphide, about 2.0 parts 2-mercaptobenzthiazole, about 1.0 part benzthiazyl - 2 - cyclohexenylsulphenamide and about 0.5 part cadmium stearate give a product having 220 kp./cm.² tensile strength, 595% elongation at break, 22 kp. structural stability, 20% elasticity, 26% permanent elongation, Shore hardness A 67 (20° C.) and a DIN abrasion of 59.

(IV) About 100 parts polyurethane composition, about 30 parts high abrasion furnace black, about 2.0 parts sulphur, about 4.0 parts dibenzthiazyl disulphide, about 2.0 parts mercaptobenzthiazole, about 1.0 part zinc salt of mercaptobenzthiazole and about 0.5 part cadmium stearate give a product having 255 kp./cm.² tensile strength, 517% elongation at break, 23 kp. structural stability, 20% elasticity, 19% permanent elongation, Shore hardness A 70 (20° C.) and a DIN abrasion of 63.

(V) About 100 parts polyurethane composition about 30 parts high abrasion furnace black, about 2.0 parts sulphur, about 4.0 parts dibenzthiazyl disulphide, about 2.0 parts mercaptobenzthiazole, about 1.0 part zinc-N-ethylphenyldithiocarbamate and about 0.5 part cadmium stearate give a product having 283 kp./cm.² tensile strength, 480% elongation at break, 23 kp. structural stability, 20% elasticity, 15% permanent elongation, Shore hardness A 65 (20° C.) and a DIN abrasion of 58.

(VI) About 100 parts polyurethane composition, about 30 parts high abrasion furnace black, about 2.0 parts sulphur, about 4.0 parts dibenzthiazyl disulphide, about 2.0 parts 2-mercaptobenzthiazole, about 1.0 part zinc salt of isopropyldithiocarbonic acid ester give a product having 255 kp./cm.² tensile strength, 528% elongation at break, 21% elasticity, 25 kp. structural stability, 19% permanent elongation, Shore hardness A 60 (20° C.) and a DIN abrasion of 57.

(VII) About 100 parts polyurethane compositions, about 30 parts high abrasion furnace black, about 5.0 parts zinc oxide active, about 1.5 parts sulphur, about 1.5 parts tetramethylthiuramic disulphide, about 0.75 part 2-mercaptobenzthiazole and about 1.0 part benzthiazyl-2-cyclohexylsulphenamide give a product having 165 kp./cm.² tensile strength, 372% elongation at break, 19 kp. structural stability, 21% elasticity, 16% permanent elongation and a Shore hardness (a) of 63 (20° C.).

(VIII) About 100 parts polyurethane composition, about 30 parts high abrasion furnace black, about 5.0 parts zinc oxide active, about 1.5 parts sulphur, about 1.5 parts tetramethylthiuramic disulphide, about 0.75 part 2-mercaptobenzthiazole and about 1.0 part 2,5-dimercaptothiazole give a product having 202 kp./cm.² tensile strength, 445% elongation at break, 23 kp. structural stability, 22% elasticity, 21% permanent elongation and a Shore hardness (a) of 66 (20° C.). The DIN abrasion is exceptionally high at 100.

(IX) About 100 parts polyurethane composition, about 30 parts high abrasion carbon black, about 2.0 parts sulphur, about 4.0 parts dibenzthiazyldisulphide, about 2.0 parts 2-mercaptobenzthiazole, about 0.5 part cadmium stearate and about 1.0 part zinc salt of 3-mercaptotriazole give a product having 272 kp./cm.² tensile strength, 520% elongation at break, 24 kp. structural stability, 21% elasticity, 18% permanent elongation, Shore hardness A 63 (20° C.) and a DIN abrasion of 48.

(X) About 100 parts polyurethane composition, about 30 parts high abrasion furnace black, about 3.0 parts zinc oxide active, about 2.0 parts sulphur, about 1.0 part tetramethylthiuramic disulphide and about 1.0 part dibenzthiazyl disulphide give a product having 240 kp./cm.² tensile strength, 395% elongation at break, 20 kp. structural stability, 23% elasticity, 14% permanent elongation and a Shore hardness A 64 (20° C.).

(XI) About 100 parts polyurethane composition, about 30 parts high abrasion furnace black, about 2.0 parts $S_7NH$, about 4.0 parts dibenzthiazyl disulphide, about 2.0 parts 2-mercaptobenzthiazole, about 1.5 parts tetramethylthiuramic disulphide, about 1.0 part zinc salt of 3-mercaptotriazole and about 0.5 part cadmium stearate give a product having 304 kp./cm.² tensile strength, 520% elongation at break, 26 kp. structural stability, 22% elasticity, 18% permanent elongation, Shore hardness A 68 (20° C.) and a DIN abrasion of 49.

(XII) About 100 parts polyurethane composition, about 30 parts high abrasion furnace black, about 2.0 parts $S_7NH$, about 5.0 parts zinc oxide active, about 0.75 part 2-mercaptobenzthiazole, about 1.5 parts tetramethylthiuramic disulphide give a product having 248 kp./cm.² tensile strength, 465% elongation at break, 25 kp. structural stability, 23% elasticity, 18% permanent elongation, Shore hardness A 72 (20° C.) and a DIN abrasion of 61.

EXAMPLE 5

(Comparison)

Comparison tests with monoallyl glycerol ether as chain lengthening agent followed by cross-linking with sulphur.

(I) About 100 parts polyurethane composition, prepared from a polyester (OH number 56.5), about 6% monoallylglycerol ether and about 24% diphenyl-4,4'-diisocyanate as in Example 4 (Defo value 950) are mixed on rollers with about 30 parts high abrasion furnace black, about 5.0 parts zinc oxide, about 1.5 parts sulphur, about 1.5 parts tetramethylthiuramic disulphide and about 0.75 part 2-mercaptobenzthiazole and vulcanized at about 161° C. for about 20 minutes. The product undergoes practically no cross-linking and its physical properties can not be assessed. (Compare Example 4(I).)

(II) About 100 parts polyurethane composition according to (I), about 30 parts high abrasion furnace black, about 2.0 parts sulphur, about 4.0 parts dibenzthiazyl disulphide, about 2.0 parts 2-mercaptobenzthiazole, about 1.0 part zinc-N-ethylphenyldithiocarbamate and about 0.5 part cadmium stearate give a product having 239 kp./cm.$^2$ tensile strength, 502% elongation at break, 19 kp. structural stability, 24% elasticity, 19% permanent elongation, Shore hardness A 64 (20° C.) and a DIN abrasion of 91. (Compare Example 4(V).)

(III) For comparison with Example 4(VI), about 100 parts polyurethane composition according to (I) are mixed on rollers with about 30 parts high abrasion furnace black, about 2.0 parts sulphur, about 4.0 parts dibenzthiazyl disulphide, about 2.0 parts 2-mercaptobenzthiazole, about 1.0 part zinc salt of isopropyldithiocarbonate and vulcanized at about 161° C. for about 20 minutes. The product has 190 kp./cm.$^2$ tensile strength, 550% elongation at break, Shore hardness A 67 (20° C.) and a DIN abrasion of 100.

EXAMPLE 6

(a) Preparation of the starting material

About 1000 parts by volume of benzene are added to about 146 parts (1 mol) of N-hydroxyethyl-N'-dimethyl-aminopropylene diamine-1,3 which is obtainable at a 65% yield from N,N-dimethylpropylene-1,3-diamine and ethylene oxide, and into this is stirred about 138 parts dry potassium carbonate and a solution of about 79.5 parts (0.5 mol) of the dichlorocarbonic acid ester of 2,2-dimethyl propanediol in about 150 parts by volume of benzene at about 20 to about 25° C. After about 4 hours at about 60° C., the reaction product is filtered, the filtrate is shaken with about 200 parts by volume of water and benzene is distilled off. A pale yellow oil which crystallizes slowly remains behind as residue with 84% yield. OH number 240 (calculated 250). The material is purified by redissolving from a mixture of chloroform and petroleum ether. OH number 244 to 246 (calculated 250).

(b) Reaction according to the invention

To about 200 parts polypropylene glycol (OH number 57) dehydrated at from about 125 to about 130° C. at about 12 mm. Hg are added about 35.6 parts diphenylmethane-4,4'-diisocyanate at about 105 to about 110° C. and this temperature is maintained for about 25 minutes. The thickened mixture is cooled to about 50° C. and treated with a solution of about 12.0 parts of the compound according to (a) in about 200 parts by volume of acetone; traces of water in the acetone are taken into account when calculating the quantity of isocyanate. After about one hour, about 5.70 parts by volume of diphenylsulphate are added, stirring is continued for about 40 minutes and the solvent is removed in a water jet vacuum. By adding about 230 parts by volume of water, a very sticky emulsion is obtained which is suitable for glueing paper or wood. Stable foils of considerable tensile strength can be obtained by casting and reheating at about 60° C.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyurethane plastic prepared by reacting an organic polyisocyanate with an organic compound having a molecular weight of at least about 600 and containing active hydrogen atoms which are reactive with NCO groups and a glycol having a molecular weight less than 460 and having the formula selected from the group consisting of

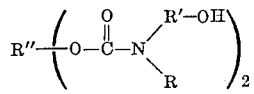

or

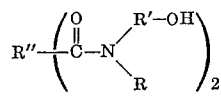

where R is a monovalent organic radical, R' is a divalent aliphatic radical having from 2 to 4 carbon atoms and R" is a divalent organic radical selected from the group consisting of the residue remaining after the removal of the carboxyl groups of a dicarboxylic acid and the residue remaining after the removal of the hydroxyl groups from an organic diol.

2. A polyurethane plastic prepared by reacting an organic polyisocyanate with an organic compound having a molecular weight of at least about 600 and containing active hydrogen atoms which are reactive with NCO groups and a glycol having a molecular weight less than 460 and having the formula

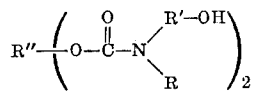

where R is a monovalent organic radical, R' is a divalent aliphatic radical having from 2 to 4 carbon atoms and R" is a divalent organic radical that is the residue remaining after the removal of the hydroxyl groups of an organic diol.

3. A polyurethane plastic prepared by reacting an organic polyisocyanate with an organic compound having a molecular weight of at least about 600 and containing active hydrogen atoms which are reactive with NCO groups and a glycol having a molecular weight less than 460 and having the formula

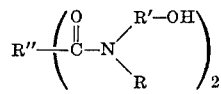

where R is a monovalent organic radical, R' is a divalent aliphatic radical having from 2 to 4 carbon atoms and R" is a divalent organic radical that is the residue remaining after the removal of the carboxyl groups of a dicarboxylic acid.

4. The product of claim 2 wherein the glycol is

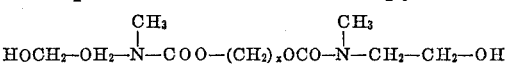

where $x$ is an integer of from 2–7.

5. The product of claim 2 wherein the glycol is

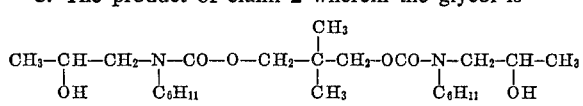

6. The product of claim 2 wherein the glycol is

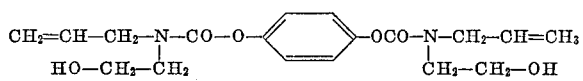

7. The product of claim 2 wherein the glycol is

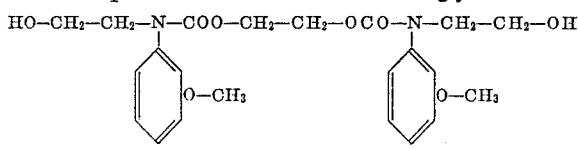

8. The product of claim 3 wherein the glycol is
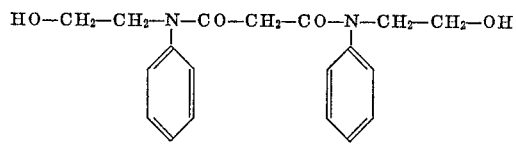
9. The product of claim 3 wherein the glycol is
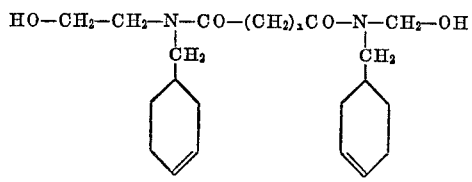
where x is an integer of from 2 to 6.
10. The product of claim 3 wherein the glycol is
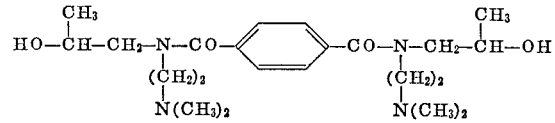
11. The product of claim 3 wherein the glycol is
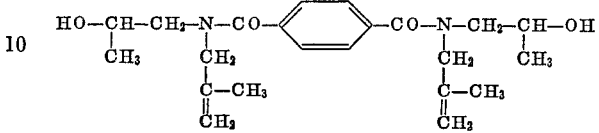
No references cited.
DONALD E. CZAJA, *Primary Examiner.*
R. W. MULCAHY, *Assistant Examiner.*